US012060255B1

(12) United States Patent
Siegel

(10) Patent No.: US 12,060,255 B1
(45) Date of Patent: *Aug. 13, 2024

(54) METHODS AND SYSTEMS FOR AN INTELLIGENT CONCENTRATE MIXING AND DELIVERY DEVICE

(71) Applicant: Bev-Edge, LLC, Ridgefield, CT (US)

(72) Inventor: Thomas Siegel, Ridgefield, CT (US)

(73) Assignee: BEV-EDGE, LLC, Ridgefield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,442

(22) Filed: Jun. 30, 2022

Related U.S. Application Data

(63) Continuation of application No. 16/907,553, filed on Jun. 22, 2020, now Pat. No. 11,407,629, which is a continuation of application No. 15/954,563, filed on Apr. 16, 2018, now Pat. No. 10,689,239.

(60) Provisional application No. 62/485,611, filed on Apr. 14, 2017.

(51) Int. Cl.

| | |
|---|---|
| ***B67D 1/00*** | (2006.01) |
| ***B67D 1/08*** | (2006.01) |
| ***B67D 7/02*** | (2010.01) |

(52) U.S. Cl.
CPC ......... *B67D 1/0016* (2013.01); *B67D 1/0043* (2013.01); *B67D 1/0878* (2013.01); *B67D 7/02* (2013.01)

(58) Field of Classification Search
CPC .. B67D 1/0016; B67D 1/0043; B67D 1/0878; B67D 7/02
See application file for complete search history.

(56) References Cited

U.S. PATENT DOCUMENTS

| | | | | |
|---|---|---|---|---|
| 5,207,784 A * | 5/1993 | Schwartzendruber .. | G07F 9/026 221/14 |
| 6,003,318 A * | 12/1999 | Busick ................. | B67D 1/0869 62/3.64 |
| 6,182,555 B1 * | 2/2001 | Scheer .................... | A47J 31/40 222/129.1 |
| 6,374,845 B1 * | 4/2002 | Melendez ............. | G01N 21/43 137/3 |
| 6,669,051 B1 * | 12/2003 | Phallen ................... | B67C 3/281 222/1 |
| 8,746,506 B2 | 6/2014 | Jersey et al. | |
| 8,985,396 B2 | 3/2015 | Jersey et al. | |
| 9,193,575 B2 | 11/2015 | Jersey et al. | |
| 2010/0116741 A1 * | 5/2010 | Cartwright ............. | C02F 1/441 210/652 |

(Continued)

*Primary Examiner* — Jeremy Carroll
(74) *Attorney, Agent, or Firm* — Mallory M. Henninger; Advent, LLP

(57) ABSTRACT

Intelligent concentrate mixing and delivery devices, systems, and methods are described. An intelligent concentrate mixing and delivery device includes at least one ingredient storage device (e.g., an ingredient cartridge) configured to store one or more ingredients and at least one micro-ingredient pump configured to pump the one or more ingredients into a mixing chamber. The mixing chamber reconstructs at least one finished concentrate from the one or more ingredients. The intelligent concentrate mixing and delivery device further includes at least one pump configured to pump the finished concentrate into a beverage dispensing system.

18 Claims, 9 Drawing Sheets

(56) References Cited

U.S. PATENT DOCUMENTS

| | | | | |
|---|---|---|---|---|
| 2010/0116742 | A1* | 5/2010 | Cartwright | B01D 61/025 210/652 |
| 2013/0325173 | A1* | 12/2013 | Crisp, III | B67D 1/0057 700/236 |
| 2014/0150669 | A1* | 6/2014 | Green | B67D 1/0058 99/323.2 |
| 2015/0158712 | A1 | 6/2015 | Jersey et al. | |
| 2016/0100709 | A1 | 4/2016 | Rudick et al. | |
| 2018/0042258 | A1* | 2/2018 | Roberts | A47J 31/441 |
| 2018/0044158 | A1 | 2/2018 | Jersey et al. | |
| 2018/0235253 | A1* | 8/2018 | Tuchrelo | A23G 9/12 |
| 2018/0257919 | A1 | 9/2018 | Balstad et al. | |
| 2018/0341891 | A1* | 11/2018 | Setchell | G06Q 10/10 |
| 2018/0368441 | A1* | 12/2018 | Tuchrelo | A23G 9/30 |
| 2019/0330043 | A1 | 10/2019 | Carpenter et al. | |
| 2020/0384415 | A1 | 12/2020 | Kamkar et al. | |

* cited by examiner

METHODS AND SYSTEMS FOR AN INTELLIGENT CONCENTRATE MIXING AND DELIVERY DEVICE

CROSS-REFERENCE TO RELATED APPLICATIONS

This disclosure claims domestic priority to U.S. Provisional Patent Application No. 62/485,611, filed Apr. 14, 2017, the contents of which are hereby incorporated by reference thereto.

BACKGROUND

A typical beverage manufactured by a beverage company can typically mix a series of ingredients with a large proportion of water (still or carbonated) to create the final beverage. The packaged version of the product can be filled in a plastic bottle, aluminum can, pouch, glass bottle, etc., and sold into the market.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Intelligent concentrate mixing and delivery devices, systems, and methods are described. An intelligent concentrate mixing and delivery device includes at least one ingredient storage device (e.g., an ingredient cartridge) configured to store one or more ingredients and at least one micro-ingredient pump configured to pump the one or more ingredients into a mixing chamber. The mixing chamber reconstructs at least one finished concentrate from the one or more ingredients. The intelligent concentrate mixing and delivery device further includes at least one pump configured to pump the finished concentrate into a beverage dispensing system.

BRIEF DESCRIPTION OF THE DRAWINGS

The Detailed Description is described with reference to the accompanying figures. The accompanying figures where like reference numerals refer to identical or functionally similar elements throughout the separate views and which together with the detailed description below are incorporated in and form part of the specification, serve to further illustrate various embodiments and to explain various principles and advantages all in accordance with the systems and methods disclosed herein.

Figure 1:
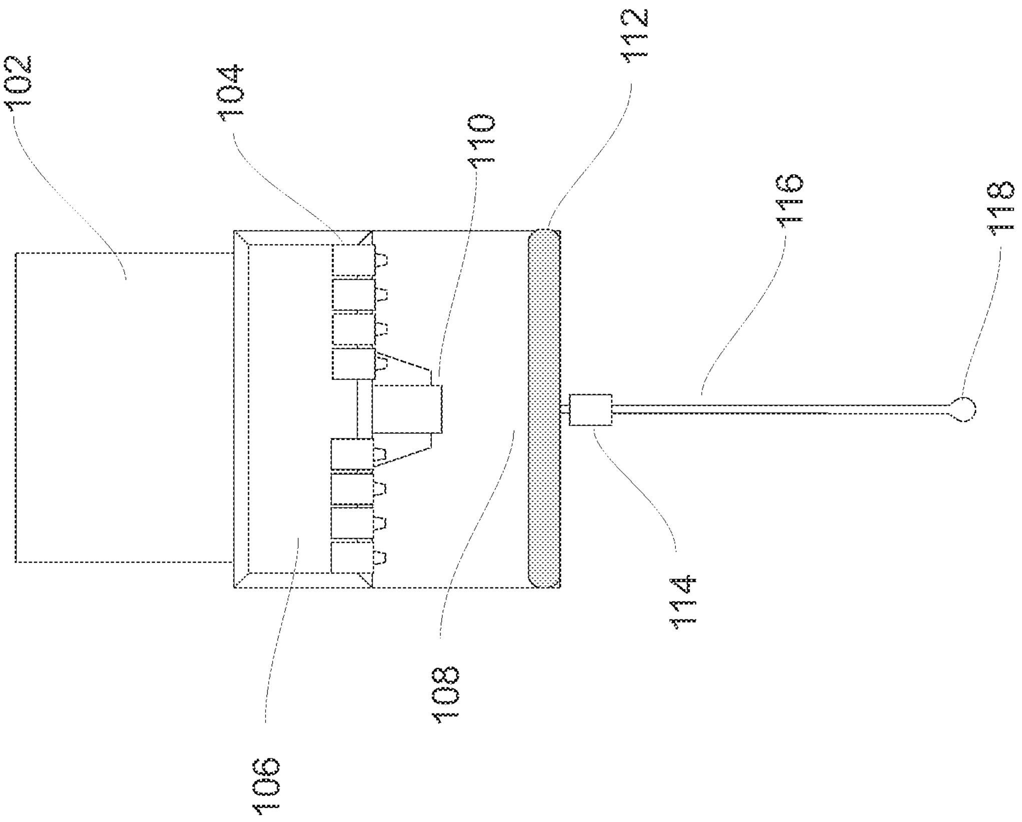
FIG. 1 illustrates a beverage dispenser with an embodiment of the sip and dump sensor installed in the drain hose, in accordance with an embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the systems and methods disclosed herein.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations arc provided so that this disclosure will be thorough and complete, and will fully convey the scope. Among other things, the features of the disclosure can be embodied as formulations, beverage products, processes, processes for making beverage products, and processes for making formulations. The following detailed description is, therefore, not to be taken in a limiting sense.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term “or” should generally be understood to mean “and/or” and so forth.

Recitation of ranges of values herein are not intended to be limiting, referring instead individually to any and all values falling within the range, unless otherwise indicated herein, and each separate value within such a range is incorporated into the specification as if it were individually recited herein. The words “about,” “approximately,” or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language (“e.g.,” “such as,” or the like) provided herein, is intended merely to better illuminate the embodiments and does not pose a limitation on the scope of the embodiments.

No language in the specification should be construed as indicating any unclaimed element as essential to the practice of the embodiments.

In the following description, it is understood that terms such as “first.” “second,” “top,” “bottom.” “up,” “down,” and the like, are words of convenience and are not to be construed as limiting terms.

Before describing in detail embodiments that are in accordance with the systems and methods disclosed herein, it should be observed that embodiments include combinations of method steps and/or system components. Accordingly, the system components and method steps have been represented where appropriate by conventional symbols in the drawings, showing only those specific details that are pertinent to understanding the embodiments of the systems and methods disclosed herein so as not to obscure the disclosure with details that will be readily apparent to those of ordinary skill in the art having the benefit of the description herein.

Food service customers (commercial restaurants, cafeterias, convenience stores, etc.) can be a very important channel for the beverage companies. Originally, finished beverages (e.g. soda) were filled in large vessels (e.g., five gallon) and transported to the end customer (e.g., a restaurant). This was a very inefficient process.

Several decades ago a much more efficient approach was launched, called post-mix (i.e. mixing the finished beverage post leaving the factory). Water is generally the highest volume ingredient in a beverage. Since water is typically readily available at the tap in a commercial environment, it can be more optimal from a packaging and distribution cost perspective to postpone the addition of water until the point of dispense in a commercial beverage dispense application.

The concentrate (typically a mixture of flavors, colors, acidulent, sweetener and perhaps a small amount of water) is packed into a bag in box (BIB), for example, in quantities of five gallons or smaller. Post mix dispensing equipment can be utilized, and the concentrate can be mixed with a restaurant supplied water source to create the finished beverages. This capability has significantly reduced transportation and packaging cost. Typically fountain soda is created with one-part syrup (as soda concentrate is termed) to about five parts water, so implementing post-mix fountain reduced the shipping quantity by about ⅚, resulting in a significant savings. Other beverages beyond soda also use this “post mix” approach, including juices, coffee, milk, tea, etc. For instance, orange juice can be used for food service applications normally use concentrated juice shipped in cartridges that fit inside a juice dispenser. Water can be similarly added within the dispenser when the consumer engages the machine to achieve the finished beverage.

Although post mix solutions are certainly superior to premix, there are still shortcomings. These include, but are not limited to:

A five gallon BIB can be quite heavy and cumbersome, usually weighing 50 pounds or more, making it quite expensive to transport and challenging for the customers (restaurant employees) to handle.

For a sugared product, upwards of ⅔ of that weight is made up of the sweetener (High Fructose Corn Syrup (HFCS), cane sugar, etc.) Yet, liquid sweeteners are really a commodity that do not make up the beverage “brand”. The beverage companies certainly rather not pay to distribute a product that can otherwise be sourced locally without affecting their brand.

In some embodiments, mixing the various ingredients together in a BIB can have a deleterious effect on the taste, freshness, shelf life, and/or overall quality of the beverage. These challenges can be particularly acute with beverages that utilize acidulents (soda and juice) and/or where typical buffers are not present (e.g., HFCS).

Five gallons of syrup can typically produce 320 12 oz (ounces) servings of a finished beverage (i.e. 2 oz of syrup added to 10 oz of water). For a high-volume brand such as the marquis brands of the big beverage companies, this can be fine. But a low-volume brand may only see 1-2 drinks/day, so 320 servings may last a year or more. This use rate may exceed the shelf life of most, if not all, various beverage concentrates.

The beverage companies have been continually looking for ways to further reduce distribution costs. With the launch of its custom (e.g., dubbed “Freestyle” by the Coca-Cola Co.) dispenser in 2009, Coke was one of the first to very cleverly “deconstruct” syrup into its base constituents; flavor concentrate, acidulent and sweetener (water is the fourth ingredient). This strategy supported the issue above relating to the sweetener. Since the sugared products can use essentially the same sweetener, a single container for sweetener can be used for all such sugared offerings. Further, this sweetener can be sourced locally, perhaps by a food service distributor, as it is not necessarily core to the “brand”.

The custom dispensing unit is supplied with cartridges filled with proprietary ingredients. For beverages that use acidulents (generally carbonated soft drinks), a dual cartridge is used; one side for the flavor/color (the “concentrate”) and the other for the acidulent. The dispenser mixes the concentrate with the acidulent, sweetener, and water at the point of dispense to form the finished product. So now instead of a 50 pound+BIB, it becomes possible to use a smaller printer-like cartridge that can be shipped (e.g., via a commercial shipping company such as UPS, FedEx, or similar), with potentially locally sourced sweetener.

The distribution savings have proven substantial, and soft drink distributors (e.g., Coke, Pepsi, 7Up) may benefit greatly if their entire dispenser base can be converted to this format. Coke, for example, has about 650,000 dispensers pouring product throughout the U.S. Yet after seven years, Coke has placed less than 100 k custom dispensing units in the field. The vast majority of their installed base still relies on legacy BIB. There are several reasons for this problem.

The biggest issue is that custom dispensing is fundamentally a very expensive mixology dispenser, targeted to the end consumer. Through a user interface, the consumer can pick from a wide array of carbonated and/or non-carbonated products, potentially with an ability to add flavor shots (also packaged in BIB) to create a custom drink. The reality therefore is that custom dispensing may really only be appropriate in food service environments where the consumer interacts directly with the machine (self-serve), which is estimated to be about 25% of the market. The majority of dispenser placements are “crew serve”, such as bar guns in bars, drop in dispensers behind the counter, drive-through dispensers, etc., and custom dispensing is really not appropriate for these placements Even within the self-serve market the custom dispensing has further limitations. The super high-volume accounts (e.g. McDonald’s) have shown little interest. With a legacy dispenser, consumers quickly engage with a Coke valve, dispense a full cup in a matter of seconds, and know what is to be delivered; but the UI (user interface) for the custom dispensing typically requires 30 seconds or more. In embodiments, only a single consumer can engage with the custom dispensing dispenser at a time, and the UI can cause delays. The volume of their accounts can be so high that the queues that can tend to form while consumers interact with the custom dispensing touchscreens, and long queues (e.g., 3-4 people) can generally be unacceptable. This problem can be further exacerbated with the occasional need to have an employee engage with a consumer who may be having a problem navigating the UI. This can be counter to efficiently running a high-volume manufacturing environment, as food service can be.

A problem with creating a new beverage (e.g., mixing of flavors outside of usual and customary ones) is that it often disappoints, creating the "sip and dump" problem. The consumer creates a beverage that mixes one or more base brands, together with one another and/or with one or more flavor shots, and simply doesn't like the outcome. The consumer dumps the beverage out in the drain and starts again. This "sip and dump" not only can creates further delays, but it can consume significantly more syrup. Anecdotally, it was reported that in a McDonald's test of Freestyle (i.e., the custom dispensing system of Coke) the account saw a 2% increase in drink sales, but a 7% increase in syrup consumption. The economics did not support continuing. In a legacy dispenser if the consumer wants a Coke, the consumer knows what he or she is getting. Unless there is a quality problem (e.g., ratio of syrup to carbonation) with the drink, the consumer typically does not discard the beverage.

The last area within the self-serve market which can be excluded is the low volume "mom and pop" stores that are configured with a self-serve unit in the dining area. The cost of a custom dispensing unit can be quite high (typically around $18,000 or a $350 monthly lease), and the increase in drink incidence simply may not justify the investment. Currently, the beverage companies often loan the dispenser to the customer and simply charge for the product; and shifting to a $350 lease is a big cost often not justified.

Raising the brix of the sweetener is an area where distribution savings are possible, but the viscosity of syrup limits the level of brix that can be used. If the sweetener is too viscous, it cannot be pumped effectively.

As such, of the approximately 650,000 Coke soft drink dispensers in the U.S., about 550.000 have not proven to be worthy candidates of custom dispensing units (such as the Freestyle unit by Coke). Even if they were, the cost to place an $18.000 dispenser in 550,000 stores would approach $10 billion. Similar costs and implementation rates can be expected where other (e.g., Pepsi, 7Up) drink dispensers are employed.

One additional challenge which has not been well addressed or understood relates to the management of the acidulent. The pH of the acids used in sodas (typically phosphoric or citric) are usually very low, even in syrups. For deconstructed solutions (e.g., custom dispensing units), such as Freestyle, the pH can be at or near 1.0. When the cartridge is first installed, secondary seals are utilized. However, the system does not address what occurs if the package is removed before emptied, in regard to acid exposure. And even when "empty", there still may be residual acid in the package which needs to be properly managed and disposed.

The challenge then is to find a solution that can allow the deconstructed product solution to become completely ubiquitous, with a much more rational capital investment. The issues of queuing delays, sip and dumps, safe handling and the like may then disappear.

In some embodiments, a deconstructed dispensing solution can provide the various benefits of reconstructing the concentrate at the customer's location (distribution savings, freshness, logistical benefits, etc.) without the disadvantages described above for existing solutions (capital costs, queuing problems, sip and dumps, etc.) Quite simply, to become ubiquitous, without an extreme capital investment, a solution can simply replace the current BIBs with cartridges of deconstructed product. In some embodiments, no other infrastructure beyond such replacement cartridges changes, with the dispenser, bundled tubing, syrup pumps, CO2 infrastructure, water filters, etc., all staying in place. The operation of the legacy equipment may not change, in principle, beyond implementing the cartridges. Additionally, a solution to the management and disposal of the acidulent may be utilized. So the dispenser, and all its required components can remain, but in place of the BIB rack and the BIBs, there can be an intelligent concentrate mixing and delivery device. The intelligent concentrate mixing and delivery device can hold the cartridges for the products to be delivered via the legacy dispenser. Those legacy dispensers today typically dispense 6-10 brands, including, for example, all the major, well known brands of at least one distributor (e.g., Coke or Pepsi products). The intelligent concentrate mixing and delivery device can offer a commensurate number of brands. Note that it is not essential that every brand operate through the intelligent concentrate mixing and delivery device. If, for instance, a limited run brand is being trialed in the market, the intelligent concentrate mixing and delivery device need not be used for that brand. A BIB solution can continue to work fine in conjunction with the brands run through the intelligent concentrate mixing and delivery device.

Each converted brand can have a dedicated mix chamber in the intelligent concentrate mixing and delivery device. The mix chamber can draw from the flavor cartridge, the acidulent cartridge (if applicable), the sweetener container (e.g., either a 5-gallon BIB or a separate tank), and the water supply (e.g., often coming from a water filter tied to the input city water line). Note that for a "diet" product which uses a highly concentrated nutritive or non-nutritive sweetener, this sweetener can generally reside in the flavor cartridge, and the sugared sweetener supply may, thus, not be utilized.

In some embodiments, the sweetener container can be quite large as it would be carry the ingredient used in many of the sugared drinks. There may be two or more sweetener containers so that the consumer could choose, for example, between "classic" sugar (i.e. HFCS) or perhaps cane sugar (used often in craft sodas and often branded as "Mexican" soda). The consumer could also potentially choose a high intensity sweetener such as Sucralose. Note there are brands that only use cane sugar, such as sports drinks (Powerade and Gatorade, for example). Finally, it is possible to distribute these liquid sweeteners in an even more concentrated format, along with some water, before entering the mix chamber, to "hydrate" the sweetener to a brix level that is readily mixed and pumped.

As such, in some embodiments, the same syrup that can be constructed or constituted in a factory (for example, made from concentrate, acidulent, sweetener and a small amount of water) can now be constructed in the intelligent concentrate mixing and delivery device on the site where the soft drink or other beverage is to be dispensed. The syrup pumps can be plumbed to the mix chambers and can pump the finished syrup through the legacy fountain lines to the dispenser. Generally, about five parts of water and, where desired, carbon dioxide for carbonation, are added to the syrup at the nozzle to create the finished beverage. The only change to the system is that the legacy fountain infrastructure is pumping product from an intelligent concentrate mixing and delivery device instead of a BIB.

From an economic perspective, it is estimated that if an intelligent concentrate mixing and delivery device could be delivered for a small fraction of what the custom mixology dispenser (e.g., such as Coke Freestyle) currently costs, perhaps less than 15% of an installed custom dispensing system.

Note for simplification and clarity the term cartridge is broadly used to describe the package carrying the typically deconstructed ingredient. The cartridge could be more broadly a pouch, BIB, plastic housing, etc. Additionally, the term concentrate is used broad to cover deconstructed soda ingredients, juice concentrate, concentrated milk, coffee and/or tea, etc.

Intelligent concentrate mixing and delivery devices, systems, and methods are described. An intelligent concentrate mixing and delivery device includes at least one ingredient storage device (e.g., an ingredient cartridge) configured to store one or more ingredients and at least one micro-ingredient pump configured to pump the one or more ingredients into a mixing chamber. The mixing chamber reconstructs at least one finished concentrate from the one or more ingredients. The intelligent concentrate mixing and delivery device further includes at least one pump configured to pump the finished concentrate into a beverage dispensing system.

FIG. 1 illustrates a typical legacy beverage dispenser with the embodiment, including a sip and dump sensor 114 plumbed into a drain hose 116, leading to a drain 118. Note that the sip and dump sensor 114 may be plumbed into a beverage dispenser 106 in a cup tray 112 within a drain system 108, particularly for non-retrofit installations. In this example, a typical self-serve beverage dispenser 106 is depicted with a top mounted ice machine 102 connected to an ice dispense chute 110. The beverage dispenser 106 in this illustration depicts eight post-mix valves 104, yet it is to be understood that any other number of post-mix valves 104 may be provided. The consumer or operator can typically dispense some quantity of ice from the ice chute 110 into a cup and then engage the post-mix valve 104 for the brand they have chosen.

Figure 2:
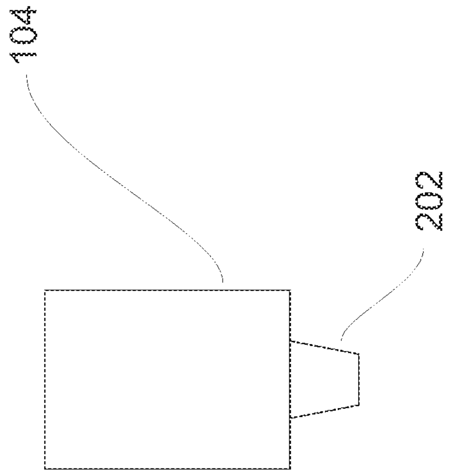
FIG. 2 provides a block diagram of a post mix valve and nozzle, in accordance with an embodiment of the present disclosure.

FIG. 2 illustrates block diagram of an embodiment depicting a post-mix valve 104 with a dedicated nozzle 202. Note that flavor shots can be dispensed similarly through a post-mix valve, albeit with only the flavor shot product dispensed through this valve (i.e. the water is added in the brand post-mix valve). Some dispensers may allow the brand and flavor shot choice to occur through a touchscreen user interface.

Figure 3:
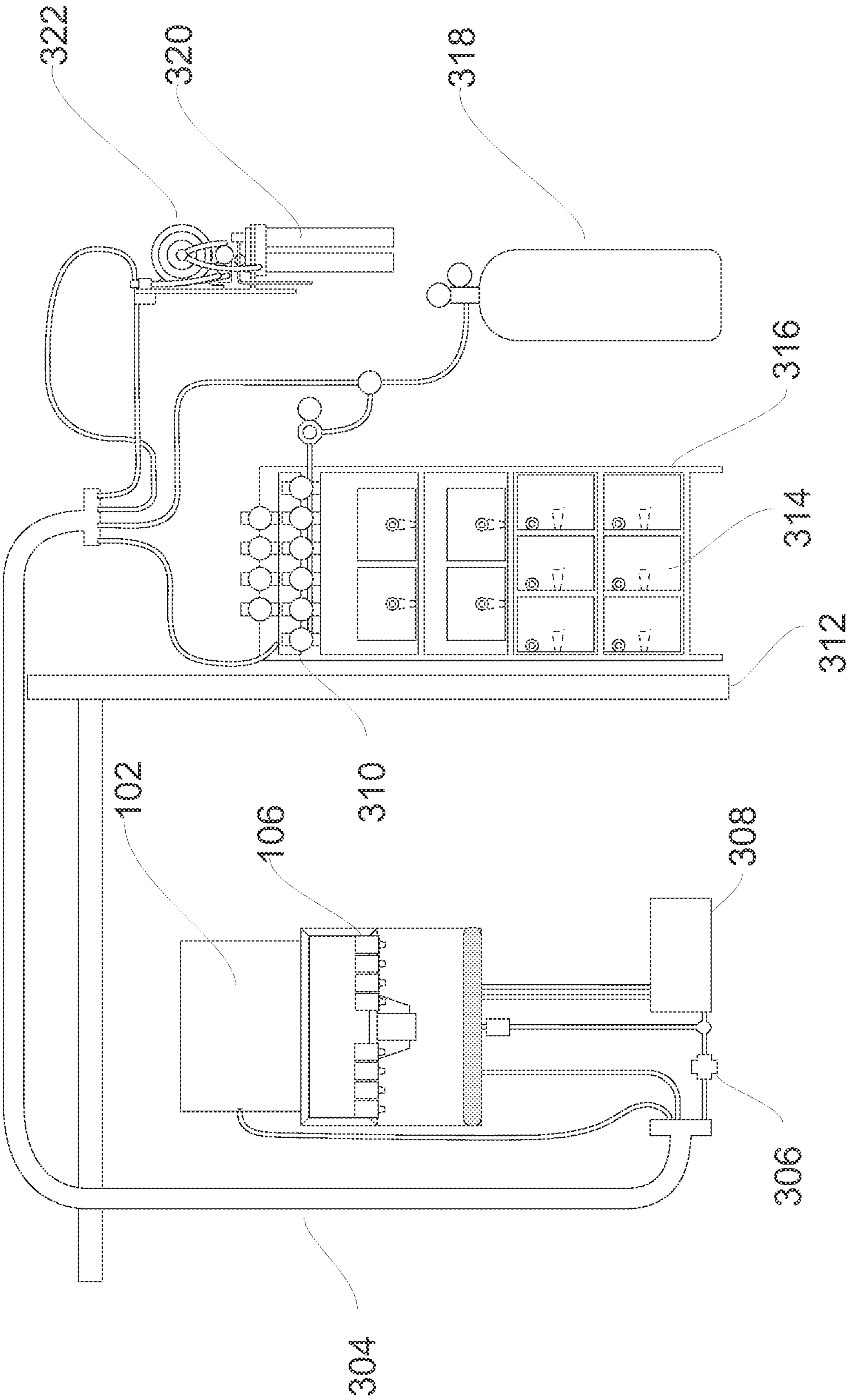
FIG. 3 illustrates the various components of a typical legacy dispense system, in accordance with an embodiment of the present disclosure.

FIG. 3 illustrates a full legacy fountain system. The product can be stored in the BIBs 314, which are placed on the BIB rack 316. The product is pumped through the bundled tubing 304 by the pumps (CO2, electric, etc.) 310. The CO2 supply tank 318 supplies CO2 to both the depicted CO2 pumps 310 and to the pump deck 308 which supplies carbonated water when carbonated beverages are dispensed. The water supply is provided in this depiction from the city water line and may be run through the water pressure booster 322 and the water filter 320, up through the bundled tubing 304. The water pressure may be limited by a water pressure regulator 306. The ice maker 302 uses the provided water, as does the beverage dispenser 106. The back-room components, such as the water filter 320, CO2 supply tank 318, and/or BIB components 310, 316 and 314 are generally housed in the back of house, as depicted by the wall 312 or at another location in the same building but otherwise generally remote to the fountain system. The length of the bundled tubing 304 is typically 75 to 100 feet, but may be shorter or longer as required.

Figure 4:
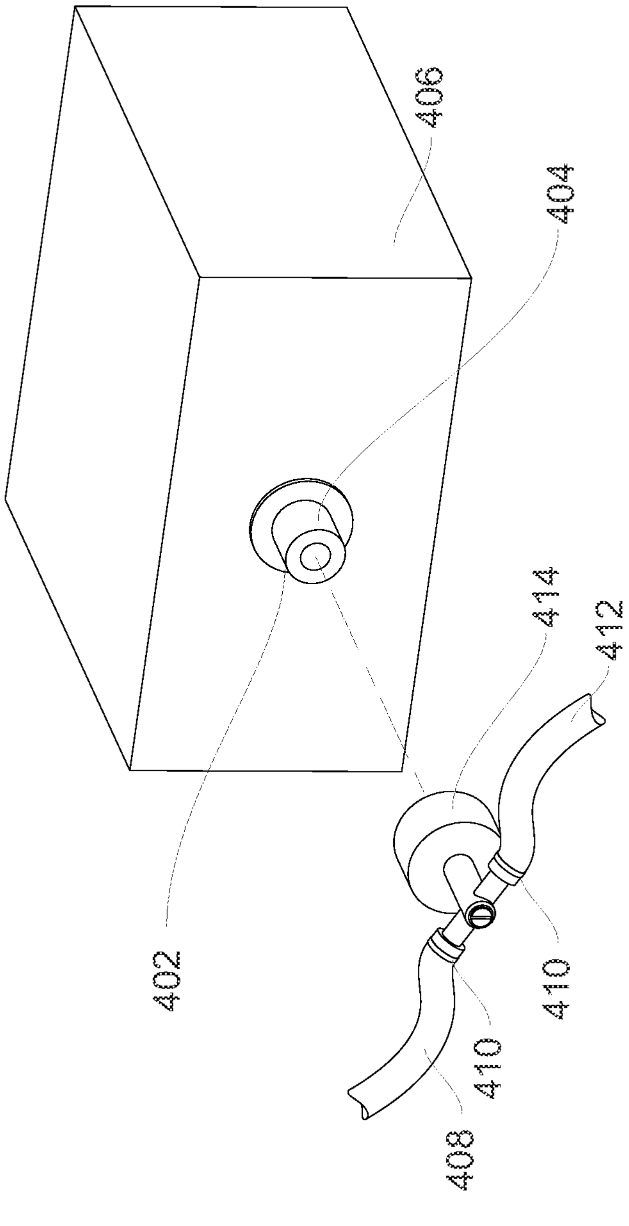
FIG. 4 illustrates an embodiment of use of a bag in box connector which attaches to the fitment on a bag in box and includes a water line to the connector which provides for flooding the removed package with water to raise the residual pH, as needed, in accordance with an embodiment of the present disclosure.

FIG. 4 illustrates an embodiment of the connection between the BIB 314 and the connector 414. The BIB fitment 404 is attached to the BIB bag 402. In some embodiments, the BIB bag 402 is a five gallon bag. In other embodiments, the BIB bag 402 can be a one gallon bag or a three gallon bag. The BIB fitment 404 and/or the BIB bag reside in the BIB box 406, together the BIB 314. The BIB connector 414 can be attached to the BIB rack 316 where the BIBs are stored when in use. In this embodiment an output line 408 for the concentrate is provided, along with an input water line 412. These lines 408, 412 are attached to the BIB connector 414 (e.g., with clamps such as Oetiker clamps 410, or the like). Through a mechanical means or actuated by a pressure switch, the water line 412 is opened to flood the BIB bag 402 to lift the pH of the residual product. This FIG. 4 illustrates the flooding feature utilized with a legacy BIB 314 system, but applications to cartridges, particularly where the acidulent is isolated contain much lower pH and are therefore more in need of this water flooding feature, as described below.

Figure 5:
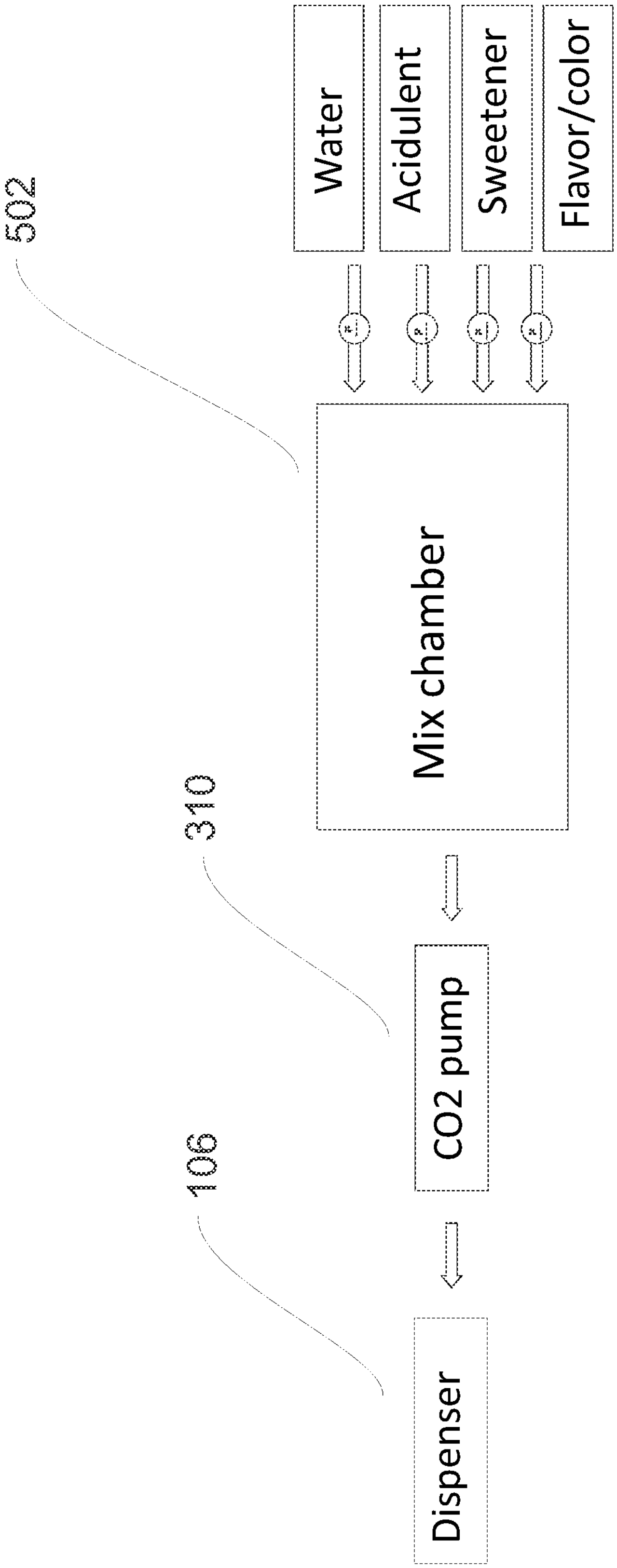
FIG. 5 illustrates an embodiment of the mix chamber in the intelligent concentrate mixing and delivery device, in accordance with an embodiment of the present disclosure.

FIG. 5 illustrates in a block diagram the structure of the mix chamber 502. The varied ingredients, potentially including but not limited to water, acidulent, sweetener and flavor/color arc pumped into the mix chamber 502. Once mixed, the pump 310 (CO2 is depicted) pushes the syrup through the bundled tubing 304 up to the beverage dispenser 106. Once the concentrate leaves the mix chamber 502, the beverage dispense system treats the product as if it had been dispensed through a legacy BIB 314.

Figure 6:
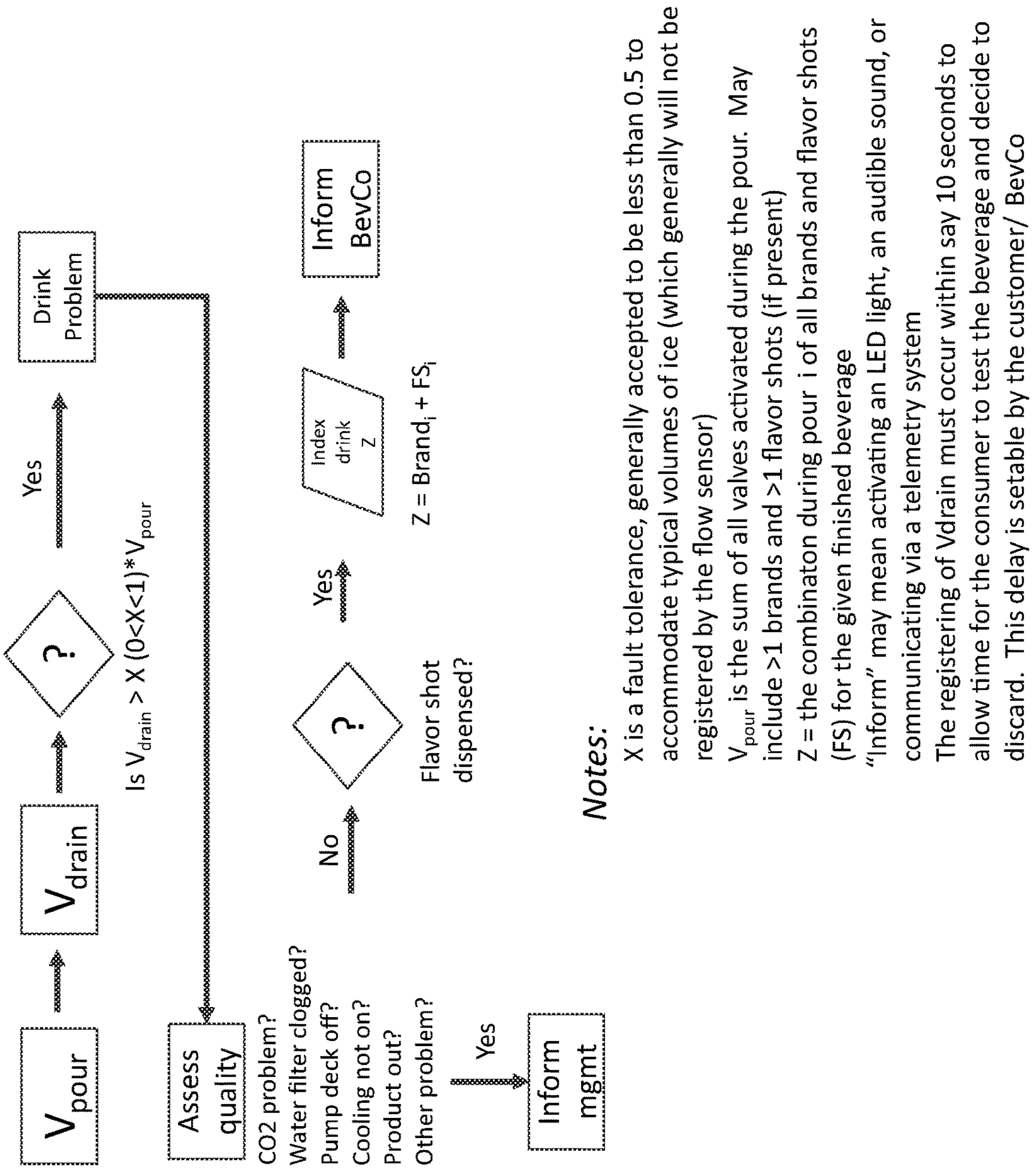
FIG. 6 provides a logic chart to illustrate the use of the sip and dump sensor, in accordance with an embodiment of the present disclosure.

FIG. 6 illustrates in a block diagram that depicts an example dispensing algorithm for determining consumer satisfaction with a dispense choice. In embodiments, the beverage dispense system can include control circuitry operable to execute one or more dispensing algorithms to determine consumer satisfaction of a dispense choice. For example, the control circuitry can execute the dispensing algorithm to determine consumer satisfaction of a customized beverage. Beverages can be customized in a variety of ways by the consumer. For example, the addition of flavor shots (e.g., lemon, vanilla, cherry, grape, lime, etc.) can be included as an additional dispense choice, allowing consumers to customize their delivered beverages. The addition of a flavor shot to a brand may deliver a finished beverage that is not satisfactory to the consumer, and in this case the consumer may dump out the beverage into the drain system 108. When this occurs, the sip and dump sensor 114 will register flow through the drain 108. Since the post-mix valves 104 are activated for t seconds, and given a known flow rate (e.g., about 1.5 to about 4.5 ounces/second), it is possible to ascertain with high probability if a consumer dumped the finished beverage just poured. The consumer may activate several post-mix valves 104 and several flavor shot valves 104 to create the drink. If both the sum of the volume of the pours ($V_{pour}$) achieves a defined threshold, and if the sip and dump sensor 114 is activated (e.g., $V_{drain}$) within a defined time (e.g., about 10 seconds), then the system (e.g., via one or more processors) will determine that the consumer rejected the finished beverage. $V_{pour}$ is the sum of all valves activated during the pour. $V_{pour}$ can include at least one brand of soft drink. $V_{pour}$ can also include one or more flavor shots (if present). X is a fault tolerance (e.g., less than about 0.5) to accommodate standard volumes of ice (which generally will not be registered by the flow sensor). When $V_{drain}>X\ (0<X<1)*V_{pour}$ the system will determine that there is a problem with the finished drink (e.g., the consumer rejected the finished beverage).d With that assessment, the system can then assess quality parameters of the system (e.g., CO2 supply, drink temperature, water filter status, cooling system status, product output, etc.) and determine if a beverage quality problem exists and take appropriate actions thereby. If one or more of these parameters are not acting normally, the system can generate an alert to management. The alert can include one or more of an electronic communication such as a SMS message, an e-mail message, a light (e.g., LED light), an audible sound, a communication via a telemetry system, and so forth. If these parameters are all operating normally, the system determines that the combination poured is not satisfactory to the consumer. The system can further determine whether or not a flavor shot was dispensed, and if so, an Index Drink Z. Z is the combination during pour; of all brands and flavor shots (FS) for the finished beverage (e.g., Z=brand$_i$+FS$_i$). In embodiments, the system can issue an alert (e.g., to the beverage company) based on the identification of a drink problem. The alert can include one or more of an electronic communication such as a SMS message, an e-mail message, a light (e.g., LED light), an audible sound, a communication via a telemetry system, and so forth. That data can be collected and potentially acted upon. For example, the combination of brand; and FS$_i$ may not be offered going forward if enough consumers react similarly to that mixture, etc.

Figure 7:
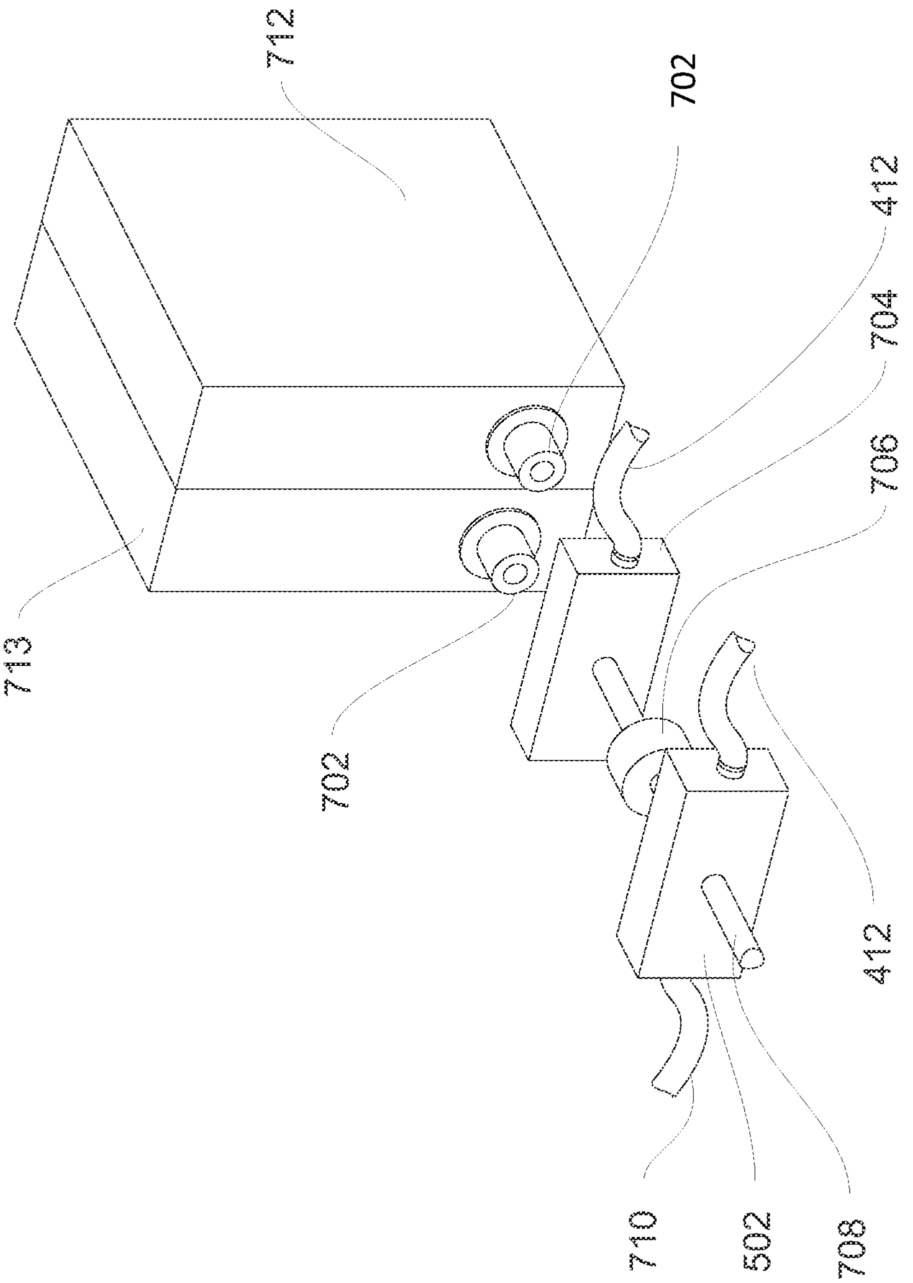
FIG. 7 illustrates one embodiment of the engagement of the cartridges with the mix chamber of the intelligent concentrate mixing and delivery device, in accordance with an embodiment of the present disclosure.

FIG. 7 illustrates one embodiment of a deconstructed ingredient cartridge 712 connecting via cartridge fitments 702 to a back block 704. The backblock 704 connects to one or more micro-ingredient pumps 706 (e.g., positive displacement, gear, lobe, peristaltic, etc.). In some embodiments, a separate micro-ingredient pump 706 will be used for each ingredient. In other embodiments, a single pump 706 can be used when similar proportions of similar viscosity fluids are utilized, or where a Venturi effect is used to pull one ingredient along with a pumped ingredient. The micro-ingredient pumps 706 push the ingredients into the mix chamber 502, which is combined with some water from the water line 412 and sweetener from a sweetener line 710. The mixed concentrate is pulled out from the concentrate line 708 by the CO2 (or similar) pumps 310. In one embodiment, a water line 412 is also plumbed to the back block 704 to allow the water flood feature to be engaged when the acidulent cartridge 713 is to be removed.

Figure 8:
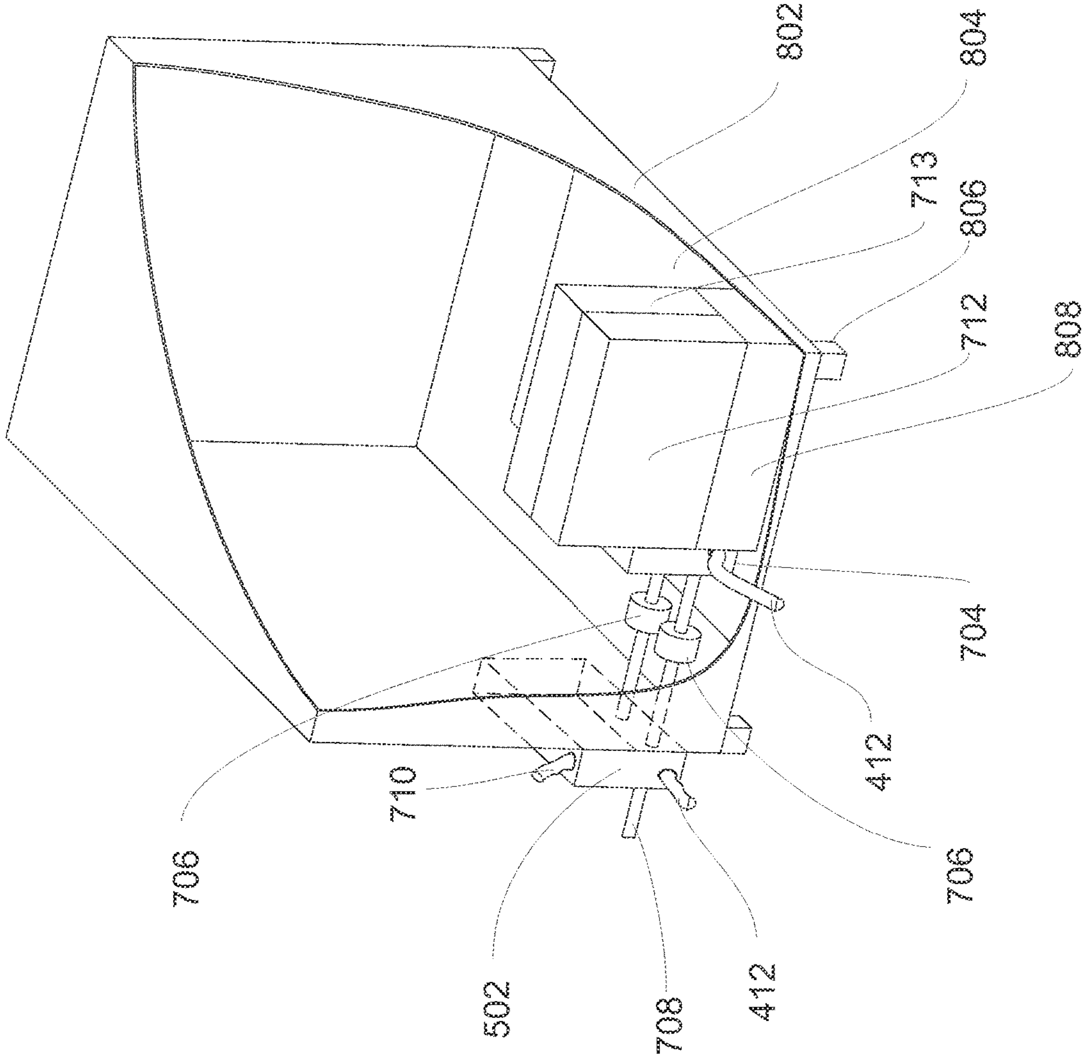
FIG. 8 illustrates one embodiment of the intelligent concentrate mixing and delivery device, in accordance with an embodiment of the present disclosure.

FIG. 8 illustrates an embodiment of an intelligent concentrate mixing and delivery device 802. The ingredient cartridges 712 sit on the cartridge shelf 804. The intelligent concentrate mixing and delivery device 802 can have legs 806 that keep the intelligent concentrate mixing and delivery device 802 off the ground. The ingredient cartridges 712 connect to the back block 704 which are connected to the micro-ingredient pumps 706. The micro-ingredient pumps 706 push the ingredients into the mix chamber 502. The mixing chamber is also coupled with a water line 412 and a sweetener line 710. The cartridge ingredients combine with the water and the sweetener in the mixing chamber 502 to form a concentrate mixture. The concentrate mixture is pumped out by the concentrate pumps 310, to the beverage dispenser 106 where a significantly higher amount of water is added (very often five parts water to one part concentrate) to create the finished beverage. Some of the cartridge ingredients would need to be agitated periodically to prevent crystallization and/or separation. An agitation device 808 can be added to either at the specific cartridge locations or to the intelligent concentrate mixing and delivery device 802 in aggregate. In some embodiments, a timing feature can also be used. In some embodiments, the intelligent concentrate mixing and delivery device 802 can include sensors (e.g., temperature sensors) to estimate the conditions for crystallization.

In embodiments, the water line 412 can also be utilized for controlling the pH of the ingredient cartridge 712. For example, the water line 412 can be configured to add an appropriate amount of water (e.g., a water flood feature) to regulate the pH of the ingredient cartridge 712. In some embodiments, the water line 412 can be configured to add an appropriate amount of water to raise the pH of the ingredient cartridge 712 to a level that is appropriate for safe handling by an operator. In some embodiments, the water line 412 is configured to add water to the ingredient cartridge 712 based on a determination of a low level or out of stock condition of the ingredient cartridge. For example, the ingredient cartridge 712 can include one or more sensors (e.g., pressure switch or the like) for determining an out of stock condition of the ingredient cartridge. Based on the determination of the out of stock condition, the water line can be configured to add an appropriate amount of water to raise the pH level of the ingredient cartridge to a level appropriate for safe handling. In some embodiments, a dispense feature of the ingredient cartridge 712 can be disabled based on the determination of the out of stock condition. In some embodiments, the water line 412 is configured to add an appropriate amount of water to raise the pH level of the ingredient cartridge 712 when the ingredient cartridge 712 is removed from the device 802 (e.g., by an operator). In other embodiments, the water line 412 is configured to add an appropriate amount of water to raise the pH level of the ingredient storage device based on a temperature of the intelligent concentrate mixing and delivery device. For example, the device 802 can include one or more sensors (e.g., temperature sensors) configured to sense the temperature of the device 802. When the device is determined to exceed a specified temperature threshold (e.g., one that approaches the flash point of the acidulent), the water flood feature can be executed. In some embodiments, the device 802 can utilize a high alkalinity liquid as a neutralizing ingredient.

Figure 9:
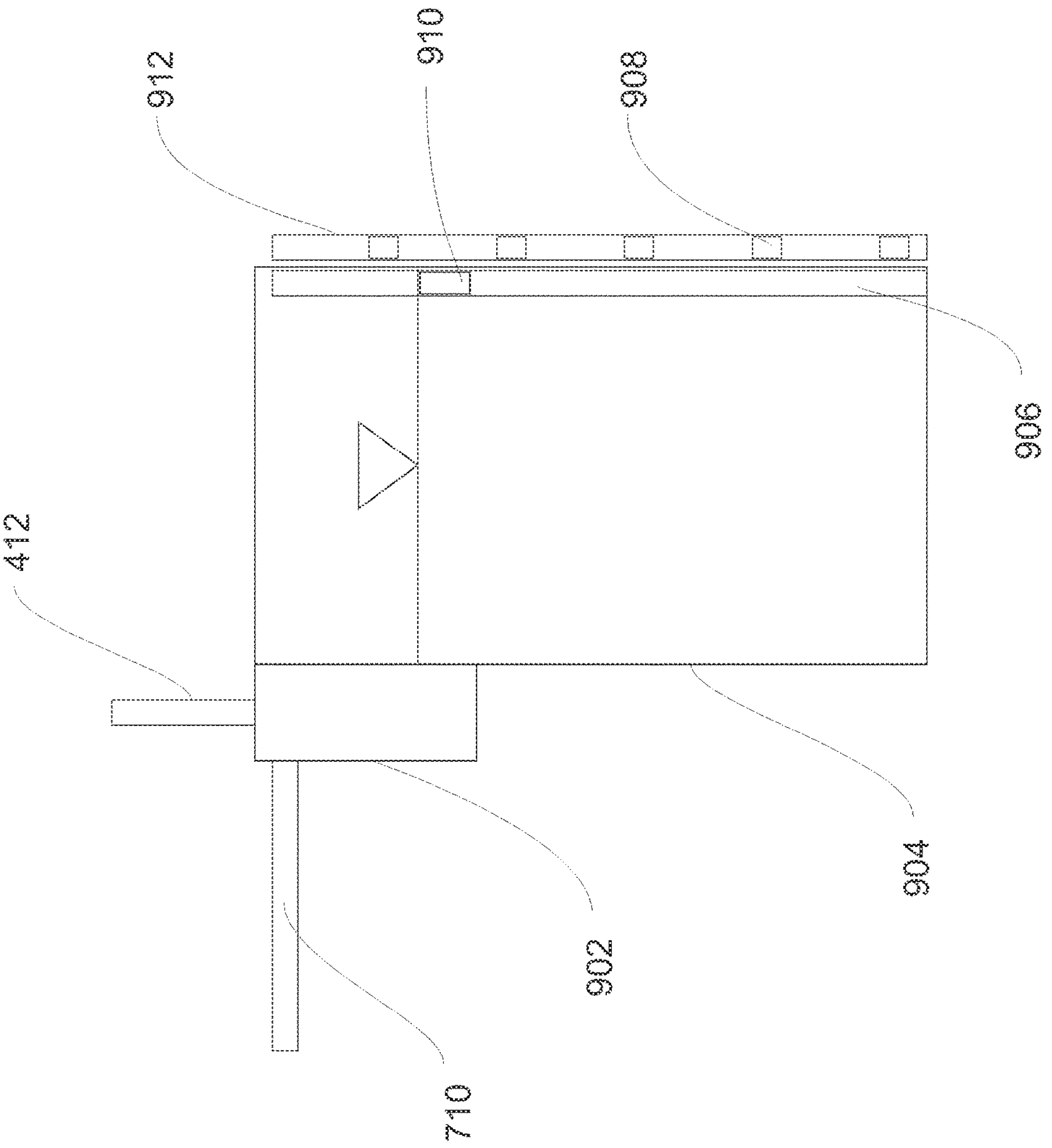
FIG. 9 illustrates one embodiment of a sweetener hydrator device, in accordance with an embodiment of the present disclosure.

FIG. 9 depicts an intelligent concentrate mixing and delivery device 802 utilized in combination with a sugar storage and hydration device. Having higher brix of the sugar lowers the distribution costs, but also increases the viscosity and increases pumping difficulty. The sugar hydrator can be adjacent to or included within the sweetener tank 904. In embodiments, the sugar hydrator can add and mix some amount of water to the sweetener. The mixture of water and sweetener is mixed/blended before pushing into the intelligent concentrate mixing and delivery device 802, forming a lower viscosity sweetener. The lower viscosity sweetener can be readily pumped to the intelligent concentrate mixing and delivery device 802, and the finished syrup can be formulated. In one specific embodiment, the sweetener storage tank 904 uses a float magnet 910 that runs in a float magnet guide 906. A sensor array board 912 is placed proximal to the sweetener storage tank 904 adjacent to the float magnet guide 906. The sensor array board 912 includes a series of proximity sensors 908 that can accurately estimate the volume of remaining sweetener in the tank. The sugared sweetener tank may connect with a "telemetry" feature that allows communication back to the sweetener source. The ingredient cartridges 712 may also have liquid level sensors to identify potential out of stock conditions and to send data back to the factory for replenishment with the same telemetry feature.

When the sweetener ingredient pump 706 is activated, high viscosity sweetener is pulled in the sweetener hydration chamber 902. A measured amount of water is added to the sweetener hydration chamber 902, based on the viscosity of the stored sweetener and the planned hydrated sweetener viscosity. The water is added through the water line 412, mixed with the high viscosity sweetener in the sweetener hydration chamber 902 and pumped on to the mix chamber 502 through the sweetener line 710.

The mixing chamber 502 itself could be large or small, perhaps holding only several ounces of finished syrup. The size of the chamber may be dictated by the required mixing apparatus to ensure proper reconstitution.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are intended to form a part of the invention as defined by the following claims, which are to be interpreted in the broadest sense allowable by law. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

REFERENCE NUMERALS

102 ice maker
104 post-mix valve
106 beverage dispenser
108 drain system
110 ice dispense chute
112 cup rest
114 sip and dump sensor
116 drain hose
118 drain
202 post-mix nozzle
304 bundled tubing
306 water pressure regulator
308 pump deck (carbonator)
312 wall
314 bag in box (BIB)
316 BIB rack
318 CO2 supply tank
320 water filter
322 water pressure booster
402 BIB bag
404 BIB fitment
406 BIB box
408 output line
410 Oediker clamp
412 water line
414 BIB connector
502 mix chamber
702 cartridge fitment
704 back block
706 micro-ingredient pump
708 concentrate line
710 sweetener line
712 ingredient cartridge
713 acidulent cartridge
802 intelligent concentrate mixing and delivery device
804 cartridge shelf
806 intelligent concentrate mixing and delivery device leg
902 sweetener hydration chamber
904 sweetener storage tank
906 float sensor guide
908 proximity sensor
910 float magnet
912 sensor array board Operation The operation of an intelligent concentrate mixing and delivery device is similar to the operation of a legacy BIB system, which will be described first.

A legacy beverage dispenser is installed with the dispenser placed appropriately for either consumer or crew operation. Typically, a water line is plumbed to the dispenser, often through a water filter system if necessary. Water boosters and pressure regulators may be used to ensure proper water pressure at the point of dispense. A CO2 source may be included for carbonated beverages, utilizing a motor and typically a vane pump to drive the CO2 into the water at high pressure. Ice is often utilized as a cooling mechanism as well as a beverage ingredient, or mechanical refrigeration is used, particularly where ice is either not readily available or desired.

The product is generally located non-adjacent to the beverage dispenser in order to save valuable front of house space and facilitate the management of the product supply chain. This typically means the product is managed in the back of house, and appropriate tubing is used to move the product up to the dispenser. The product is often pumped with CO2 pumps, but electric, gear, peristaltic etc. pumps have been used depending on applications.

Before the pump, a BIB connector is permanently attached to each tube, dedicated for each product. The product is normally housed in a BIB or cartridge and each bag (or occasionally a cartridge without a bag) has a fitment which connects to the BIB connector by the crew when a new BIB is required.

The consumer (or crew) then approaches the machine. Legacy systems normally have a single valve dedicated to a brand. The consumer may add ice to the cup, and then activates the post-mix valve. That valve then draws both the concentrate and the appropriate proportion of water into the nozzle. The mixture mixes in the nozzle and in the cup, and a finished beverage is created. Note there are also multi-flavor valves and valves that are activated with a touch-screen (e.g. Coke's Freestyle and Pepsi's Spire custom dispensing systems), but the installation and operation of the base functions is common to a discrete valve system.

In a typical legacy system the product is typically packaged in 5 gallon BIBs. The BIBs are stored on a BIB rack and connected by the bag fitment to the BIB connector to tubing that is pumped to the dispenser by a (typically CO2) pump. With the intelligent concentrate mixing and delivery device some or all of the brands are housed in the intelligent concentrate mixing and delivery device. The brands are housed in cartridges that are typically smaller as they are carrying a much smaller percentage of the overall beverage. The flavor cartridge, which contains the flavor components, colors and potentially the high intensity sweetener for "diet"

products, may represent only a few percent of the finished beverage volume. Similar is the acidulent for those appropriate products.

Each brand has a dedicated mix chamber that mixes the ingredients to form the finished concentrate. The concentrate is then pumped to the dispenser just as if the concentrate were coming from a standard BIB. Note that the sweetener supply can be outboard of the intelligent concentrate mixing and delivery device, potentially premixing with some water to stabilize and dilute the liquid sweetener to a readily pumped viscosity.

With a legacy system, once the operator discovers the need to replace a BIB, they detach the empty BIB at the connector, move a new BIB into place and reconnect the connector to the new bag fitment. With this new system, when the operator discovers a brand has been depleted, the operator simply replaces the depleted ingredient cartridge with a new ingredient cartridge in the intelligent concentrate mixing and delivery device. If the sweetener is depleted, replacement will be dependent on the packaging format used. If the liquid sweetener is stored in BIBs, that BIB is simply replaced. If a large storage vessel is used for liquid sweetener, a new storage vessel may be plumbed in, or the sweetener supplier may have to be contacted. With the use of sensors and telemetry systems, the sources of the various ingredients would be contacted before the ingredient is completely depleted, and the operator simply reconnects the new supply of ingredient. Water lines may require plumbing during the ingredient replacement process to enable some of the key features discussed.

It is to be understood that the embodiments described herein can be implemented by various types of electromechanical systems having a wide range of electrical components including, but not necessarily limited to: hardware, software, firmware, and/or virtually any combination thereof. For example, an intelligent concentrate mixing and delivery device can include a computing device including a processor and a memory. The processor provides processing functionality for the computing device and may include any number of processors, micro-controllers, or other processing systems, and resident or external memory for storing data and other information accessed or generated by the computing device. The processor may execute one or more software programs that implement the techniques and modules described herein. The processor is not limited by the materials from which it is formed or the processing mechanisms employed therein and, as such, may be implemented via semiconductor(s) and/or transistors (e.g., electronic integrated circuits (ICs)), and so forth.

The memory is an example of device-readable storage media that provides storage functionality to store various data associated with the operation of the computing device, such as the software program and code segments mentioned above, or other data to instruct the processor and other elements of the computing device to perform the techniques described herein. Although a single memory is mentioned above, a wide variety of types and combinations of memory may be employed. The memory may be integral with the processor, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the computing device, the memory may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The computing device includes a display to display information to a user of the computing device. In embodiments, the display may comprise a CRT (Cathode Ray Tube) display, an LED (Light Emitting Diode) display, an OLED (Organic LED) display, an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display may be backlit via a backlight such that it may be viewed in the dark or other low-light environments.

The display may be provided with a touch screen to receive input (e.g., data, commands, etc.) from a user. For example, a user may operate the computing device by touching the touch screen and/or by performing gestures on the touch screen. In some embodiments, the touch screen may be a capacitive touch screen, a resistive touch screen, an infrared touch screen, combinations thereof, and the like. The computing device may further include one or more input/output (I/O) devices (e.g., a keypad, buttons, a wireless input device, a thumbwheel input device, a trackstick input device, and so on). The I/O devices may include one or more audio I/O devices, such as a microphone, speakers, and so on.

The computing device may also include a communication module representative of communication functionality to permit computing device to send/receive data between different devices (e.g., components/peripherals) and/or over one or more networks. Communication module may be representative of a variety of communication components and functionality including, but not necessarily limited to: a browser; a transmitter and/or receiver; data ports; software interfaces and drivers; networking interfaces; data processing components; and so forth.

The one or more networks are representative of a variety of different communication pathways and network connections which may be employed, individually or in combinations, to communicate among the components of the system. Thus, the one or more networks may be representative of communication pathways achieved using a single network or multiple networks. Further, the one or more networks are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth.

Examples of wireless networks include, but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

The computing device is described as including a user interface, which is storable in memory and executable by the processor. The user interface is representative of functionality to control the display of information and data to the user of the computing device via the display. In some implementations, the display may not be integrated into the computing device and may instead be connected externally using universal serial bus (USB), Ethernet, serial connections, and so forth. The user interface may provide functionality to allow the user to interact with one or more applications of the computing device by providing inputs (e.g., beverage brands, flavor shots, quality parameters, etc.) via the touch screen and/or the I/O devices. For example, the user interface may cause an application programming interface (API) to be generated to expose functionality to a temperature control module to configure the application for display by the display or in combination with another display.

In implementations, the user interface may include a browser (e.g., for implementing functionality of the control modules described herein). The browser enables the computing device to display and interact with content such as a webpage within the World Wide Web, a webpage provided by a web server in a private network, and so forth. The browser may be configured in a variety of ways. For example, the browser may be configured as an amplification control module or detection control module accessed by the user interface. The browser may be a web browser suitable for use by a full resource device with substantial memory and processor resources (e.g., a smart phone, a personal digital assistant (PDA), etc.).

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the system, for example, can be wired, wireless, or some combination thereof. In the case of a software implementation, for instance, a module may represent executable instructions that perform specified tasks when executed on a processor, such as the processor described herein. The program code can be stored in one or more device-readable storage media, an example of which is the memory associated with the computing device.

It is to be understood that embodiments of the present invention described above are intended to be merely exemplary. Those skilled in the art will recognize, or be able to ascertain using no more than routine experimentation, numerous equivalents to the specific procedures described herein. All such equivalents are considered to be within the scope of the present invention and are covered by the following claims.

It is further contemplated that any embodiment or implementation of the disclosure manifested above as a system or method may include at least a portion of any other embodiment or implementation described herein. Those having skill in the art will appreciate that there are various embodiments or implementations by which systems and methods described herein can be implemented, and that the implementation will vary with the context in which an embodiment of the disclosure is deployed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An intelligent concentrate mixing and delivery device, comprising:

at least one ingredient storage device for containing one or more ingredients, the one or more ingredients including at least one of a flavor ingredient, a color ingredient, or an acidulent;

a mixing chamber for forming a concentrate from the one or more ingredients, the mixing chamber in fluid communication with the at least one ingredient storage device, wherein forming a concentrate includes combining the one or more ingredients with at least one of water, a sweetener, or an acidulent;

at least one ingredient pump in fluid communication with the at least one ingredient storage device and the mixing chamber, the at least one ingredient pump configured to pump the one or more ingredients into the mixing chamber from the at least one ingredient storage device;

a sensor coupled to the at least one ingredient storage device, the sensor configured to measure a quantity of one or more ingredients stored in the ingredient storage device; and a fluid line connected to the at least one ingredient storage device and configured to flood the at least one ingredient storage device with a fluid when the sensor determines that the quantity of the one or more ingredients stored in the ingredient storage device is less than a predetermined quantity.

2. The intelligent concentrate mixing and delivery device of claim 1, wherein the fluid line is configured to add an amount of fluid to raise the pH of the one or more ingredients stored in the at least one ingredient storage device to a level that is safe for handling by an operator.

3. The intelligent concentrate mixing and delivery device of claim 2, wherein the fluid is water.

4. The intelligent concentrate mixing and delivery device of claim 2, wherein the fluid is an alkaline liquid.

5. The intelligent concentrate mixing and delivery device of claim 1, wherein the sensor is a pressure switch or a sensor configured to weigh the one or more ingredients stored in the at least one ingredient storage device for measuring the quantity of the one or more ingredients stored in the ingredient storage device.

6. The intelligent concentrate mixing and delivery device of claim 1, further comprising a pump configured to pump the concentrate into a beverage dispense system.

7. The intelligent concentrate mixing and delivery device of claim 1, further comprising an agitation device configured to agitate the at least one ingredient storage device to prevent at least one of crystallization or separation of the one or more ingredients.

8. The intelligent concentrate mixing and delivery device of claim 1, wherein the sensor is configured for determining an out of stock condition of the ingredient storage device.

9. The intelligent concentrate mixing and delivery device of claim 8, wherein a dispense feature of the ingredient storage device is disabled based on the determination of the out of stock condition of the ingredient storage device.

10. An intelligent concentrate mixing and delivery device, comprising:

at least one ingredient storage device for containing one or more ingredients, the one or more ingredients including at least one of a flavor ingredient, a color ingredient, or an acidulent;

a mixing chamber for forming a concentrate from the one or more ingredients, the mixing chamber in fluid communication with the at least one ingredient storage device, wherein forming a concentrate includes combining the one or more ingredients with at least one of water, a sweetener, or an acidulent;

at least one ingredient pump in fluid communication with the at least one ingredient storage device and the mixing chamber, the at least one ingredient pump configured to pump the one or more ingredients into the mixing chamber from the at least one ingredient storage device;

a sensor configured to measure a temperature of one or more components of the intelligent concentrate mixing and delivery device; and a fluid line connected to the at least one ingredient storage device and configured to flood the at least one ingredient storage device with a fluid when the sensor determines that the temperature is greater than a predetermined temperature value.

11. The intelligent concentrate mixing and delivery device of claim 10, wherein the fluid line is configured to add an amount of fluid to raise the pH of the one or more ingredients stored in the at least one ingredient storage device to a level that is safe for handling by an operator.

12. The intelligent concentrate mixing and delivery device of claim 11, wherein the fluid is water.

13. The intelligent concentrate mixing and delivery device of claim 11, wherein the fluid is an alkaline liquid.

14. The intelligent concentrate mixing and delivery device of claim 10, further comprising a pump configured to pump the concentrate into a beverage dispense system.

15. The intelligent concentrate mixing and delivery device of claim 10, further comprising an agitation device configured to agitate the at least one ingredient storage device to prevent at least one of crystallization or separation of the one or more ingredients.

16. The intelligent concentrate mixing and delivery device of claim 10, wherein the sensor is configured for determining an out of stock condition of the ingredient storage device.

17. The intelligent concentrate mixing and delivery device of claim 16, wherein a dispense feature of the ingredient storage device is disabled based on the determination of the out of stock condition of the ingredient storage device.

18. An intelligent concentrate mixing and delivery device, comprising:

at least one ingredient storage device for containing one or more ingredients, the one or more ingredients including an acidulent;

a mixing chamber for forming a concentrate from the one or more ingredients, the mixing chamber in fluid communication with the at least one ingredient storage device, wherein forming a concentrate includes combining the one or more ingredients with at least one of water, a sweetener, or an acidulent;

an ingredient pump configure to pump the one or more ingredients into the mixing chamber;

a pump configured to pump the concentrate into a beverage dispense system; and a fluid line connected to the at least one ingredient storage device and configured to flood the at least one ingredient storage device with a fluid when the ingredient storage device is to be removed.

* * * * *